(12) United States Patent
Ryan et al.

(10) Patent No.: US 8,983,470 B1
(45) Date of Patent: Mar. 17, 2015

(54) AUTOMATIC IDENTIFICATION OF CLUSTERED NEAR NEIGHBOR CELLS IN WIRELESS NETWORKS

(71) Applicant: Eden Rock Communications, LLC, Bothell, WA (US)

(72) Inventors: David James Ryan, Seattle, WA (US); Jeffrey Paul Harrang, Sammamish, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 25 days.

(21) Appl. No.: 13/748,536

(22) Filed: Jan. 23, 2013

Related U.S. Application Data

(60) Provisional application No. 61/589,851, filed on Jan. 23, 2012.

(51) Int. Cl.
| | | |
|---|---|---|
| *H04W 36/00* | (2009.01) | |
| *H04W 24/02* | (2009.01) | |
| *H04W 24/10* | (2009.01) | |
| *H04W 16/18* | (2009.01) | |

(52) U.S. Cl.
CPC .............. *H04W 24/02* (2013.01); *H04W 24/10* (2013.01); *H04W 16/18* (2013.01); *H04W 36/0061* (2013.01); *H04W 36/0083* (2013.01)
USPC ........... 455/436; 455/437; 455/438; 455/439; 455/446; 455/456.1; 455/422.1; 455/63.1

(58) Field of Classification Search
CPC . H04W 16/24; H04W 36/0083; H04W 24/02; H04W 36/0061; H04W 84/18; H04W 48/16; H04W 16/18; H04W 36/0055; H04W 36/00
USPC ........ 455/436–446, 422.1, 453, 456.1, 456.2, 455/456.3, 456.5, 456.6, 63.1, 63.2
See application file for complete search history.

(56) References Cited

U.S. PATENT DOCUMENTS

| | | | |
|---|---|---|---|
| 7,050,803 B2 * | 5/2006 | Celedon et al. ............... | 455/436 |
| 7,130,627 B2 * | 10/2006 | Lundh et al. .................. | 455/434 |
| 7,363,038 B2 * | 4/2008 | Kim et al. ..................... | 455/438 |
| 7,493,120 B2 * | 2/2009 | Kim et al. ..................... | 455/436 |
| 7,546,126 B2 * | 6/2009 | Beasley et al. ................ | 455/436 |
| 7,941,148 B2 * | 5/2011 | Roskowski et al. ........... | 455/436 |
| 2011/0090820 A1 * | 4/2011 | Hussein et al. ............... | 370/255 |

* cited by examiner

*Primary Examiner* — Olumide T Ajibade Akonai

(57) ABSTRACT

A networked computer system in a cellular communications network comprises a processor, a memory, and a non-transitory computer readable medium with computer executable instructions stored thereon which, when executed by the processor, cause the processor to generate a local cluster list by identifying a plurality of cells that are relevant to a maintenance or optimization operation of a reference cell using at least one neighbor cell list, a centroid of the reference cell, radio network planning data, or usage data of the reference cell, the local cluster list including local cluster information for the plurality of cells that are relevant to the maintenance or optimization operation, and store the local cluster list in the memory.

20 Claims, 11 Drawing Sheets

AUTOMATIC IDENTIFICATION OF CLUSTERED NEAR NEIGHBOR CELLS IN WIRELESS NETWORKS

CROSS-REFERENCES TO RELATED APPLICATIONS

The present invention claims priority to U.S. Provisional Application No. 61/589,861, filed Jan. 23, 2012, which is herein incorporated by reference for all purposes.

BACKGROUND OF THE INVENTION

Wireless networks rely on a large number of individual base stations or cells to provide high capacity wireless services over large coverage areas such as market areas (e.g. cities), surrounding residential areas (e.g. suburbs, counties), highway corridors and rural areas. Maximizing the capacity of such networks while utilizing limited licensed radio frequency spectrum involves reusing time and frequency channel resources throughout the cells in the network. Third and fourth generation commercial wireless network technologies (3G and 4G) maximize system performance via high levels of time and frequency channel resources whereby most, if not all, cells in a network are provisioned to utilize the same radio frequency spectrum. This can lead to excessively high levels of interference and poor performance, particularly for users operating at the overlapping boundary regions between neighboring cells. Advanced signal processing and resource scheduling techniques in the time, frequency, and/or code domains are typically used to manage the co-channel interference that results from high levels of radio frequency spectrum reuse, but conventional methods force network planners and optimization teams to rely on conservative reuse planning approaches to avoid excessive co-channel interference between neighboring cells.

Self Optimizing Network (SON) technologies such as coordinated multi-node scheduling introduce dynamic methods of coordinating radio frequency resource utilization between nearby cells in order to improve overall resource utilization efficiency while simultaneously avoiding excessive co-channel interference between neighboring cells. These multi-cell SON automation technologies require an identification of nearby cells within the wireless network that have a high probability of causing interference to one another, and thus become candidates for multi-cell resource coordination. Advanced network performance monitoring technologies benefit from the identification of 'clusters' of nearby cells that have strong interdependencies from a radio frequency resource sharing standpoint (that is, clusters of cells that are highly likely to interfere with each other without sufficient coordination of resources).

Traditionally, the identification of close proximity nearby neighboring cells has been based on preplanned estimates utilizing geographic positioning and predictions of radio frequency (RF) path loss isolation or coupling between network cells to create a neighbor cell list. This approach relies on many assumptions regarding real world propagation conditions and does not dynamically respond to changing network conditions such as the addition or removal or re-engineering of network cells (e.g. cell splitting), nor does it respond to seasonal changes in radio frequency propagation conditions (e.g. seasonal foliage changes) or actual cell utilization patterns within the network.

The primary purpose of neighbor cell lists is to identify a limited set of cells, and transmit the list to user equipment for use in a handoff operation. As such, it is not necessary to analyze variables beyond geographic proximity, and possibly limited deductions on RF characteristics, in order to establish the list. Neighbor cell lists are typically created when a base station is initially installed, and may be periodically updated as new cells are established within a limited geographical area.

Neighbor cell lists have limited utility beyond handover operations. Neighbor lists don't account for current conditions, actual use patterns, or other dynamic variables. Due to size limitations, neighbor lists do not include all cells that affect, or could potentially affect, transmission characteristics of a reference cell. Certain optimization and maintenance operations can benefit from additional information relevant to a particular reference cell without placing a large burden on network equipment.

BRIEF SUMMARY OF THE INVENTION

Embodiments of the present invention relate to an apparatus and method for establishing, updating, and maintaining a local cluster for a reference cell. The local cluster includes nearby wireless cells that have a strong interdependency based on actual and time dynamic operating conditions. The local cluster can be used in a maintenance or optimization operation.

According to an embodiment of the present invention, a networked computer system in a cellular communications network comprises a processor, a memory and a non-transitory computer readable medium with computer executable instructions stored thereon. When the instructions are executed by the processor they perform a method including generating a local cluster list by identifying a plurality of cells that are relevant to a maintenance or optimization operation of a reference cell using any one of a neighbor cell list, a centroid of the reference cell, radio network planning data, usage data of the reference cell, or a combination thereof. The local cluster list may include local cluster information for the plurality of cells that are relevant to the maintenance or optimization operation, and store the local cluster list in the memory.

In an embodiment, generating the local cluster list using at least one neighbor cell list includes extracting a first neighbor cell list from the reference cell. A plurality of target cells are identified from the reference cell's neighbor cell list. Neighbor cell lists are extracted from each of the plurality of target cells. Cells in the neighbor cell lists from each of the plurality of target cells in the local cluster list are included in the local cluster list.

In an embodiment, generating the local cluster list using the centroid of the reference cell includes calculating a location of the centroid of the reference cell. An area of a first tier may be established by calculating the area of a first circle with a first radius around the centroid. A plurality of cells within the first tier is determined, and added to the local cluster list.

In an embodiment, A bandwidth area is calculated for each of the cells in the first tier, and determinations are made regarding whether the centroid of the reference cell is within the beamwidth area of each of the cells in the first tier. If the centroid is in the beamwidth area, the associated cell is added to the cluster list, but it is not added if the centroid is not in the beamwidth area.

In an embodiment, the area of a second tier is established by calculating the area of a second circle with a second radius greater than the first radius around the centroid and subtracting the area of the first circle from the second circle. A plurality of cells in the second tier area are identified and added to the local cluster list, which may include designating the cells as being in the second tier. Second tier beamwidth areas area calculated for each cell within the area of the second tier and outside the area of the first tier. It is determined whether the centroid is within the second tier beamwidth area of each cell within the area of the second tier and outside the area of the first tier. If the centroid is within the second tier beamwidth area, the cell associated with the second tier beamwidth area is added to the local cluster list, and if the centroid is not within the second tier beamwidth area, the cell associated with the second tier beamwidth area is not added to the local cluster list.

In an embodiment, cells which have attempted a handover operation with the reference cell in a time period are added to the local cluster list. Thus, usage data may be used to create a local cluster list.

In an embodiment, the local cluster list is refined. Refining the local cluster list may include calculating a location of a centroid of the reference cell, establishing an area of a first tier by calculating the area of a first circle with a first radius around the centroid, determining whether each cell in the list of the plurality of cells is located within the area of the first tier, and if each cell is not located within the area of the first tier, removing each cell from the local cluster list.

In an embodiment, refining the local cluster list may further include, for each cell of the plurality of cells within the first tier, calculating a beamwidth area, determining whether the centroid is within the beamwidth area, and if the centroid is not within the beamwidth area, removing the cell associated with the beamwidth area from the local cluster list.

In another embodiment, refining the local cluster list includes extracting geographic information from a geographic information system. A threshold value is established, and a radio frequency (RF) transmission characteristic value between the reference cell and a cell within the local cluster list is estimated. If the threshold value exceeds the estimated RF transmission characteristic value, the cell is removed from the local cluster list.

In an embodiment, refining the local cluster list includes determining whether a handover operation has been attempted between a cell within the local cluster list and the reference cell within a time period. If no handover operation has been attempted between the cell within the local cluster list and the reference cell within the time period, the cell is removed from the local cluster list.

In an embodiment, the local cluster list is used to perform a maintenance operation for maintaining the cellular communications network or an optimization operation for optimizing the cellular communications network.

Aspects of the present invention may be embodied in a networked computer system, a method, or on a non-volatile computer readable medium.

DETAILED DESCRIPTION OF THE INVENTION

Embodiments of the present invention relate to local cluster information for a reference cell in a cellular network. A reference cell is defined to be any cell in a wireless cellular network that may have associated with it a group of cells that collectively with the reference cell form a local cluster. Each cluster has a unique reference cell. The local cluster information includes cells that are relevant to optimization and maintenance operations for the reference cell. A list of relevant cells may be referred to as a local cluster list. Local cluster information may be stored in the local cluster list, and may include information relating to the reference cell as well. The local cluster list can be embodied on a non-transitory computer readable medium including a system memory, which in turn may be a component in a networked computer system. The contents of a local cluster are defined in part by processes described herein.

Local cluster information can be useful to a technician that is trying to perform a maintenance operation such as mitigating the effects of a malfunctioning or improperly configured antenna or radio. The technician can use the local cluster information to determine the best course of action to take, such as making adjustments to neighboring cells, or taking no action. In another example, a technician may determine that a reference cell is overloaded. In this case, the local cluster can be used to identify the cells whose parameters can be adjusted in conjunction with the reference cell to perform a load balancing operation. In an implementation, processes are completely or in-part performed by a computer instead of a technician.

A maintenance operation include any operation associated with the diagnosis, maintenance, and repair of equipment associated with transmitting or receiving communications through a cell in a wireless network. Optimization operations include balancing a resource load such as aggregate traffic volume between a plurality of cells, adjusting radio coverage, improving radio network capacity, and other processes for improving the performance of one or more cell in a wireless network.

Figure 1:
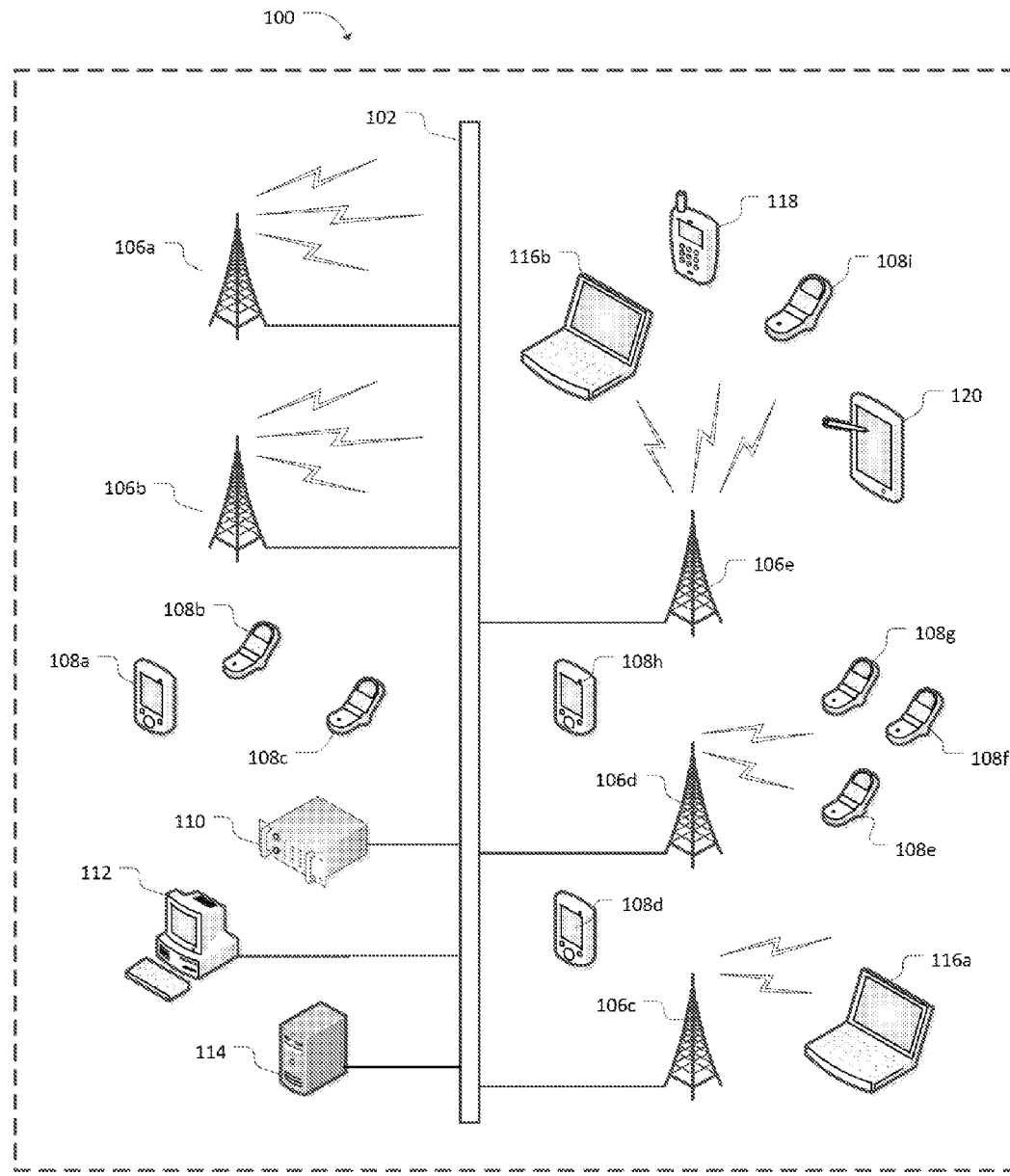
FIG. 1 illustrates a networked computer system according to embodiments of the present invention.

FIG. 1 illustrates an exemplary networked computing system 100 including various wired and wireless computing devices that may be utilized to implement processes associated with various embodiments of the present invention. These processes may include, but are not limited to network communications state determinations such as interference metric determinations, network resource monitoring, neighboring cell interference rankings, and sub-band transmit power configuration processes.

A networked computing system 100 may include a group of service provider controller devices 110, 112, and 114, any of which may be Network Resource Controllers (NRCs) or have NRC functionality; network base stations 106a-e, any of which may be NRCs or have NRC functionality, that may share overlapping wireless coverage with one or more neighboring base stations within a particular region of the networked computing system 100; multiple user equipment (UE) including cell phone/PDA devices 108a-i, laptop/netbook computers 116a-b, handheld gaming units 118, electronic book devices or tablet PCs 120, and any other type of common portable wireless computing device that may be provided with wireless communications service by any of the network base stations 106a-e; and a data communications network 102, including a backhaul portion that can facilitate distributed network communications between any of the network controller devices 110, 112, and 114 and any of the network base stations 106a-e.

As would be understood by those skilled in the art, in most digital communications networks, the backhaul portion of a data communications network 102 may include intermediate links between a backbone of the network, which are generally wireline or fiber, and sub-networks or network base stations 106a-e located at the periphery of the network. For example, cellular equipment, such as any of user equipment 108a-i, 116a-b, 118, and 120, communicating with one or more network base stations 106a-e may constitute a local sub-network. The network connection between any of the network base stations 106a-e and the rest of the world may initiate with a link to the backhaul portion of an access provider's communications network 102 (e.g., via a point of presence).

A Network Resource Controller (NRC) is a physical entity that may include software components. An NRC may facilitate processes associated with various embodiments of the present invention. In accordance with an embodiment of the present invention, an NRC may be a physical device, such as a network controller device 110, 112, and 114 or a network base station 106a-e. In yet another embodiment, an NRC may be a logical software-based entity that can be stored in the volatile or non-volatile memory or memories, or more generally in a non-transitory computer readable medium, of a physical device such as a network controller device 110, 112, and 114, or a base station 106a-e.

In accordance with various embodiments of the present invention, the NRC has presence and functionality that may be defined by the processes it is capable of carrying out. Accordingly, the conceptual entity that is the NRC may be generally defined by its role in performing processes associated with the creation, storage, use and maintenance of local clusters. Therefore, depending on the particular embodiment, the NRC entity may be considered to be either a physical device, and/or a software component that is stored in the computer readable media such as volatile or non-volatile memories of one or more communicating device(s) within a networked computing system 100.

In an embodiment, any of the service provider controller devices 110, 112, and 114, and/or network base stations 106a-e (optionally having NRC functionality or considered to be a NRC) may function independently or collaboratively to implement processes associated with various embodiments of the present invention. Further, processes may be carried out via any common communications technology known in the art, such as those associated with modern Global Systems for Mobile (GSM), Universal Mobile Telecommunications System (UMTS), Long Term Evolution (LTE) network infrastructures, etc.

In accordance with a standard GSM network, any of the service provider controller devices 110, 112, and 114 (NRC devices or optionally having NRC functionality) may be associated with a base station controller (BSC), a mobile switching center (MSC), or any other common service provider control device known in the art, such as a radio resource manager (RRM). In accordance with a standard UMTS network, any of the service provider controller devices 110, 112, and 114 (optionally having NRC functionality) may be associated with a network resource controller (NRC), a serving GPRS support node (SGSN), or any other common service provider controller device known in the art, such as a radio resource manager (RRM) or operations and maintenance controller (OMC). In accordance with a standard LTE network, any of the service provider controller devices 110, 112, and 114 (optionally having NRC functionality) may be associated with an eNodeB base station, a mobility management entity (MME), or any other common service provider controller device known in the art, such as an RRM or OMC.

In an embodiment, any of the service provider controller devices 110, 112, and 114, the network base stations 106a-e, as well as any of the user equipment 108a-i, 116a-b, 118, and 120 may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. In an embodiment, any of the service provider controller devices 110, 112, and 114, or any of the network base stations 106a-e may employ any number of common server, desktop, laptop, and personal computing devices.

In an embodiment, any of the user equipment 108a-i, 116a-b, 118, and 120 may be associated with any combination of common mobile computing devices (e.g., laptop computers, netbook computers, tablet computers, cellular phones, PDAs, handheld gaming units, electronic book devices, personal music players, MiFi™ devices, video recorders, etc.) having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and powerline cable, along with any other wireless communication technology known in the art. In an embodiment, any of the service provider controller devices 110, 112, and 114, the network base stations 106a-e, and user equipment 108a-i, 116a-b, 118, and 120 may include any standard computing software and hardware necessary for processing, storing, and communicating data between each other within the networked computing system 100. The computing hardware realized by any of the network computing system 100 devices (e.g., any of devices 106a-e, 108a-i, 110, 112, 114, 116a-b, 118, and 120) may include: one or more processors, volatile and non-volatile memories, user interfaces, transcoders, modems, wireline and/or wireless communications transceivers, etc.

Further, any of the networked computing system 100 devices (e.g., any of devices 106a-e, 108a-i, 110, 112, 114, 116a-b, 118, and 120) may include one or more computer readable media encoded with a set of computer readable instructions which, when executed, can perform all or a portion of processes associated with embodiments of the present invention. In context with various embodiments of the present invention, it should be understood that wireless communications coverage associated with various data communication technologies (e.g., network base stations 106*a-e*) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
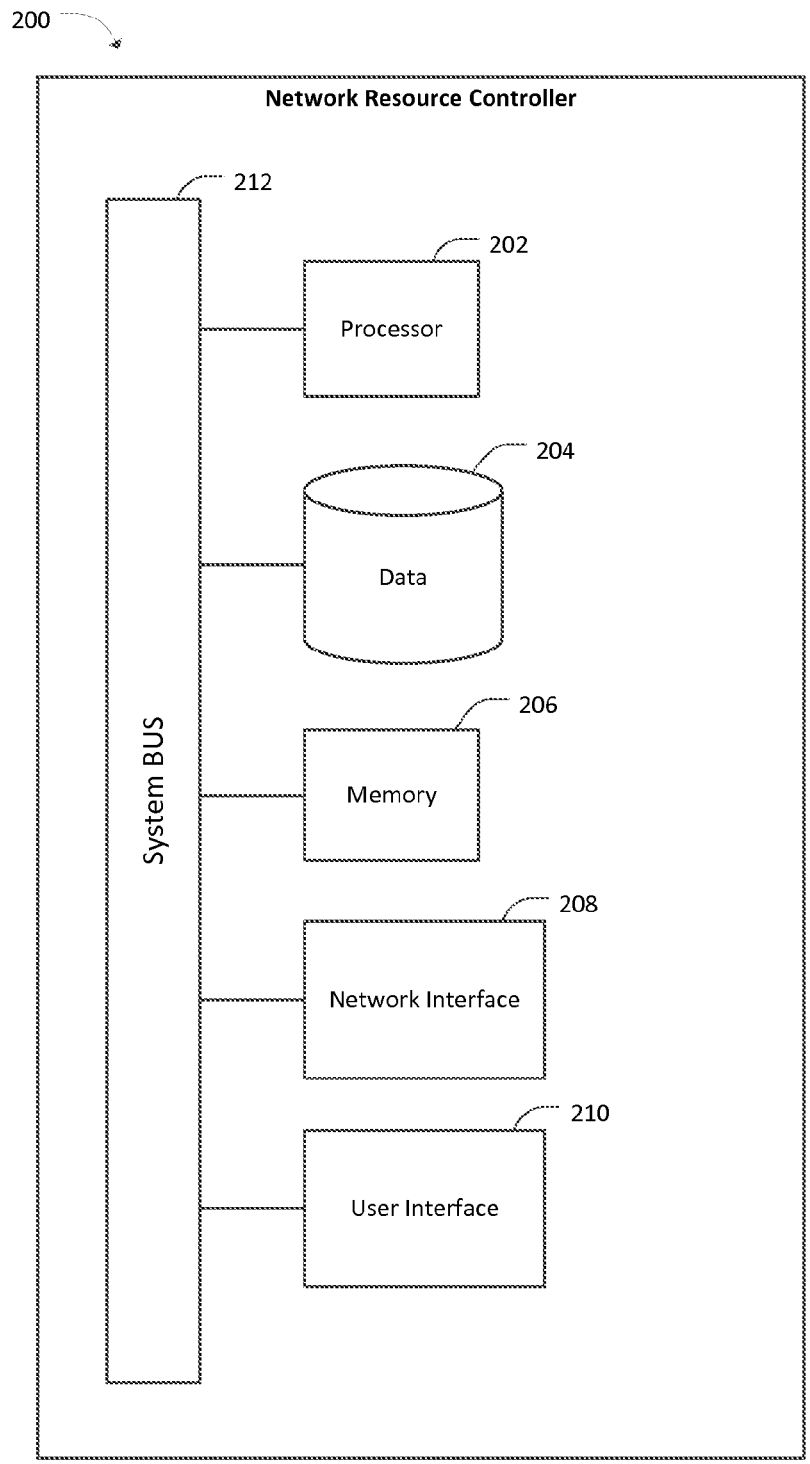
FIG. 2 illustrates a network resource controller according to embodiments of the present invention.

FIG. 2 illustrates a block diagram view of an NRC 200 that may be representative of any of the network base stations 106*a-e* or any of the network controller devices 110, 112, and 114 depicted in FIG. 1. In accordance with an embodiment of the present invention, the NRC 200 may be associated with any common base station or network controller device known in the Art, such as an eNodeB (optionally comprising a wireless modem), RRM, MME, RNC, SGSN, BSC, MSC, etc. The NRC 200 may include one or more processor 202, which may be a central processing unit (CPU). In an embodiment, the processor 202 may include an arithmetic logic unit (ALU) that performs arithmetic and logical operations and one or more control unit (CU) that extracts instructions and stored content from memory and then executes and/or processes them, calling on the ALU when necessary during program execution.

The processor 202 may be responsible for executing computer programs, which may be included in data 204. Data 204 may be stored in memory 206. Memory 206 may be any form of volatile or non-volatile memory, and generally includes both volatile (RAM) and non-volatile (e.g., ROM) memory. In various embodiments, data 204 is stored on an ASIC, flash memory such as a USB drive, an EPROM, a solid state or magnetic drive, or other types of optical, magnetic, or semiconductor non-volatile computer readable media. When memory 206 is RAM, data 204 may be temporarily loaded into the RAM to be accessed by processor 202.

The NRC 200 may also include a network interface component 208 that can facilitate the NRC's 200 communication with the backhaul 102 portion or the wireless portions of the network computing system 100 of FIG. 1, and may facilitate a user or network administrator accessing the NRC's 200 hardware and/or software resources. The network interface may be coupled to a base station 106 to extract information from or add information to the base station 106. In various embodiments, the network interface 208 may be a direct data coupling such as a universal serial bus (USB) connection, an RS-232 interface, or other interface for exchanging electronic information.

The NRC 200 may include a user interface 210, which in turn may include one or more display components configured to provide textual or graphic information to a user, and one or more user input device such as a mouse, touchpad, or keyboard, for inputting information into the NRC 200. User interface 210 may be configured to display state information of the NRC 200 or any component of the system 100. All of the components of the NRC 200 may be operatively connected through a system BUS 212.

In specific embodiments of the present invention, local clusters, neighbor cell lists, usage data, geographical data, and RF signal data may be stored in memory 206. Program instructions for instructing processor 202 to execute one or more processes associated with embodiments of the present invention may be stored as data 204. In another embodiment, by way of example, program instructions may be stored on an optical disk or portable external USB drive that is not included in memory 206.

Figure 3:
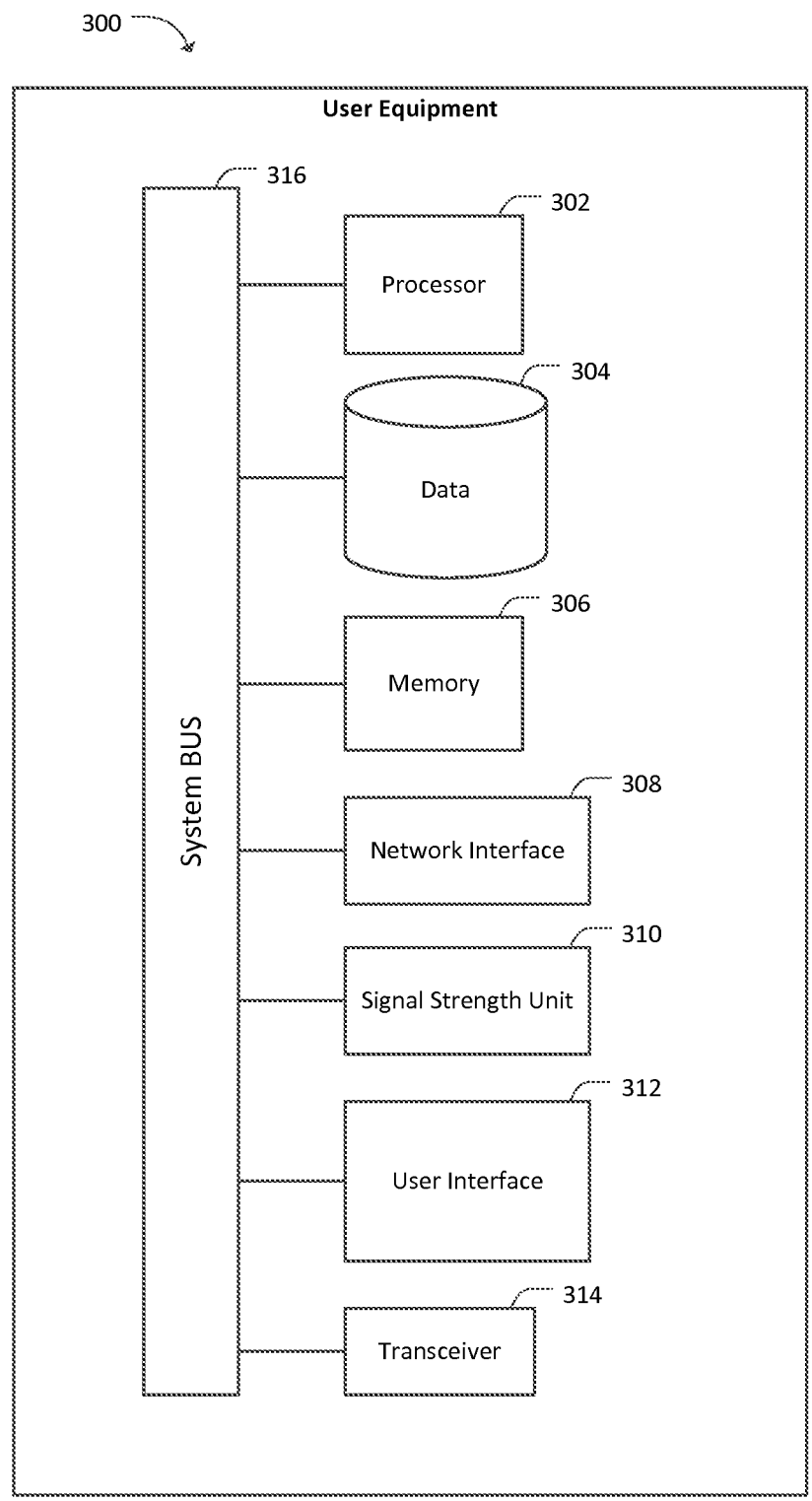
FIG. 3 illustrates user equipment according to embodiments of the present invention.

FIG. 3 illustrates a block diagram view of user equipment (UE) 300 which may in wireless communication with a base station. User equipment 300 may be any of user equipment 108*a-i*, 116*a-b*, 118, 120, 210*a-e*, 212*a-e*, 214*a-c*, or 216*a-b* depicted FIG. 1.

In accordance with an embodiment of the present invention, the user equipment 300 may include one or more processor 302. A processor may be a central processing unit (CPU) 302. In an embodiment, the processor 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The processor 302 may be responsible for executing all computer programs included in the data 304 of the user equipment 300.

The user equipment 300 may also include memory 306, a network interface 308, a user interface 310, and a system bus 316. These components are similar to the corresponding components in the network resource controller 200, and therefore a detailed description thereof is not provided. User equipment 300 is generally configured to exchange information with a base station 106 through transceiver 314 according to one or more wireless communication technology.

User equipment 300 includes data 304, which may be stored on a non-transitory computer readable medium, and the medium may be included in or separate from memory 306. Data may include computer executable instructions which, when executed by processor 302, perform one or more process associated with embodiments of the present invention. In specific embodiments, data 304 may include handover information, which may in turn be transmitted to a base station 106 and/or an NRC 200.

A local cluster includes information that is relevant to maintenance and optimization operations for a reference cell. A local cluster may be embodied on a non-volatile computer readable medium, including a memory, which is in a networked computer system 100. Within the system 100, the local cluster may be stored in an NRC 200, a base station 106, or some other computing device with memory that is coupled to the network of system 100.

Figure 4:
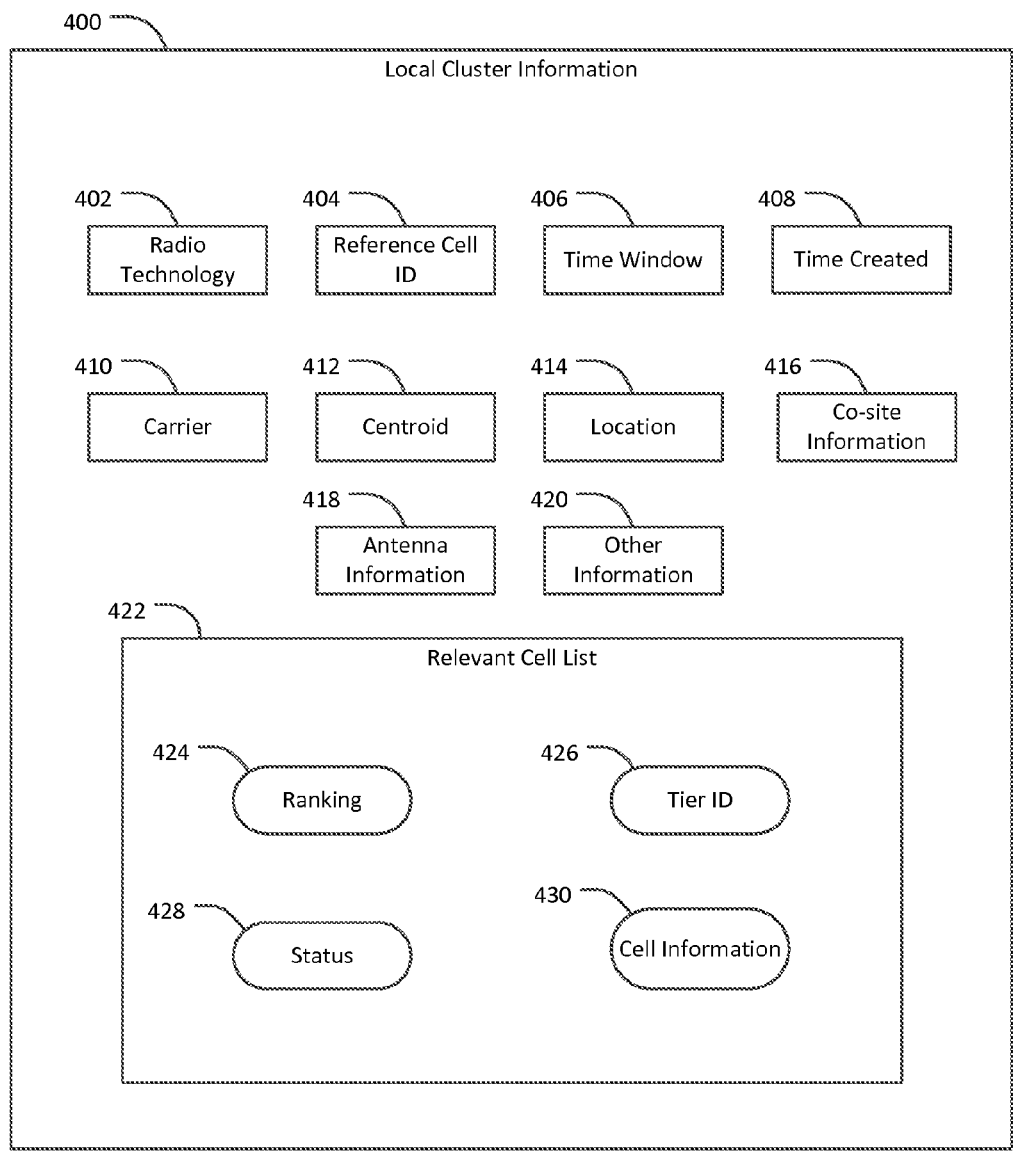
FIG. 4 illustrates a local cluster according to embodiments of the present invention.

As shown in FIG. 4, a local cluster list 400 includes information about the reference cell as well as information about other cells that are relevant to optimization and maintenance operations of the reference cell. As used herein, the term "reference cell" refers to a cell in a cellular network which may be the subject of an optimization or maintenance operation. The use of the term reference cell may indicate one or more characteristics such as the physical area, location, or the frequency band, or one or more devices associated with the cell such as an antenna or group of antennas, and the site or base station serving the cell. The physical area of a cell may be defined by the atmospheric volume and/or corresponding geographical area that receives RF energy above a threshold value.

As seen in the embodiment of FIG. 4, a local cluster list 400 include properties of the reference cell such as the radio technology 402, the reference cell ID 404, an operational time window 406, the time created 408, the radio carrier ID 410, centroid 412, location 414, and co-site information 416. The radio technology 402 is the technology type or standard used to transmit and receive communications within the cell. Examples of technology 402 that may be included in local cluster list 400 are 2G, 3G, 4G, CDMA, GSM, LTE, OFDM, etc. The technology 402 may be any Radio Access Technology (RAT) used for cellular communication.

The reference cell ID 404 may be a series of letters and numbers that is a unique identifier for the reference cell. Time window 406 may be the start and end times, or total amount of time, in which one or more time-based operations used to create or refine the relevant cell list 418 were performed. Examples of time windows are explained in further detail below.

The time created 408 is the time at which the local cluster list 400 is created. The carrier 410 is information regarding the particular radio carrier, or provider, for the reference cell. Carrier 410 may include the frequency band assigned to the reference cell.

Centroid 412 is the location of a centroid used to identify the cells of the relevant cell list 422, which will be described in further detail below. The location 414 is the physical coordinates of the reference cell, which may include latitude, longitude and altitude. In an embodiment, the location refers to the geographic coordinates of the radio antenna serving the reference cell. Co-site information 416 is information about other cells served by the same site, which are typically part of the same base station 106 as the reference cell. The co-site information may include any of elements 402 to 414 for each co-sited cell.

Antenna information 418 is information related to the to the transmit antenna of the reference cell, and may include transmitter power emitted from the antenna, boresight elevation and azimuth angles, frequency band, azimuth beamwidth, elevation beamwidth, and similar information. Other information 420 may include any additional information relevant to the local cluster. Elements 402-418 and 424-434 are illustrative and not limiting, and persons of skill in the art will recognize that embodiments of the local cluster list 400 may include additional information that is not explicitly disclosed in this description.

Relevant cell list 418 is a list of attributes of cells which may be relevant to maintenance or optimization operations for the reference cell, and may include information about the reference cell itself. The relevant cell list 422 may include one or more of elements 424-430 for each cell in the list.

Information in the relevant cell list 422 may be ordered or ranked according to relevance. Cells that have the highest estimated interference with the reference cell may be ordered on the top of the list, or have a ranking value 424 which corresponds to the relevance of the cell to maintenance or optimization of the reference cell. In other words, the cells may be arranged or ranked in order of relevance to the reference cell operations. Arranging or ranking of cells in a cluster may be done at the time of creation of the cluster or anytime thereafter, and may depend in some embodiments on the maintenance or optimization procedure to be performed to the reference cell.

In embodiments which include one or more tiers, the relevant cell list 422 includes a tier identifier 426. In embodiments with multiple tiers, as discussed in further detail below, tier identifier 426 identifies the tier in which the relevant cell is located.

Cell information 430 is information about the relevant cells. Cell information 430 may include local cluster information discussed above with respect to the reference cell, such as a unique identifier, radio technology, carrier, centroid, location, and co-site information. The contents of relevant cell list 422 are illustrative and not limiting, and persons of skill in the art will recognize that additional information not explicitly disclosed in this description may be included in various embodiments of relevant cell list 422.

A local cluster list 400 may be created on a periodic or an as-needed basis. In general, information used to create a local cluster list 400, such as usage and signal data and neighbor lists, is stored in a base station 106 or an NRC 200. Thus, in an embodiment, a local cluster list 400 can be created on demand using information that is stored for the purpose of creating a local cluster list 400, or for other purposes such as facilitating network mobility.

In an embodiment, the parameters for the local cluster list 400 are configurable by a user. For example, as discussed above, a user may create a local cluster 400 list on demand, such as by selecting an icon in a user interface. The user may also be able to select and adjust other time-based parameters, such as a time period between when local cluster lists 400 are automatically created, which is included in time window 406.

In addition, the user can adjust the time period in which data used for creating the local cluster list 400 is selected from. For example, as explained in more detail below, usage data may be used to create a local cluster list 400. In such an embodiment, a user may be able to select a time period for the usage data from the instant time, such as the previous four hours, or a time period between two specific times, such as between 6 AM and 10 AM. Other examples of the time period for usage data are one day, one week, and thirty days. In another embodiment, the time period for usage data may be a predetermined value. Thus, embodiments of the present invention provide data that is relevant to the current conditions of a reference cell.

The creation of local cluster lists may be automated. Automated creation of local cluster lists 400 may occur at a predetermined time interval, such as every 10, 30, 60, or 120 minutes. In another embodiment, local clusters may be automated to be created at relevant times corresponding to different usage patterns, such as morning commute, daytime, rushhour, evening, and late night. In still other embodiments, local cluster lists can be created daily, weekly, or monthly, or based on trigger events such as changes in antenna direction of cells in an area around the reference cell or seasonal changes in radio propagation characteristics.

Figure 5:
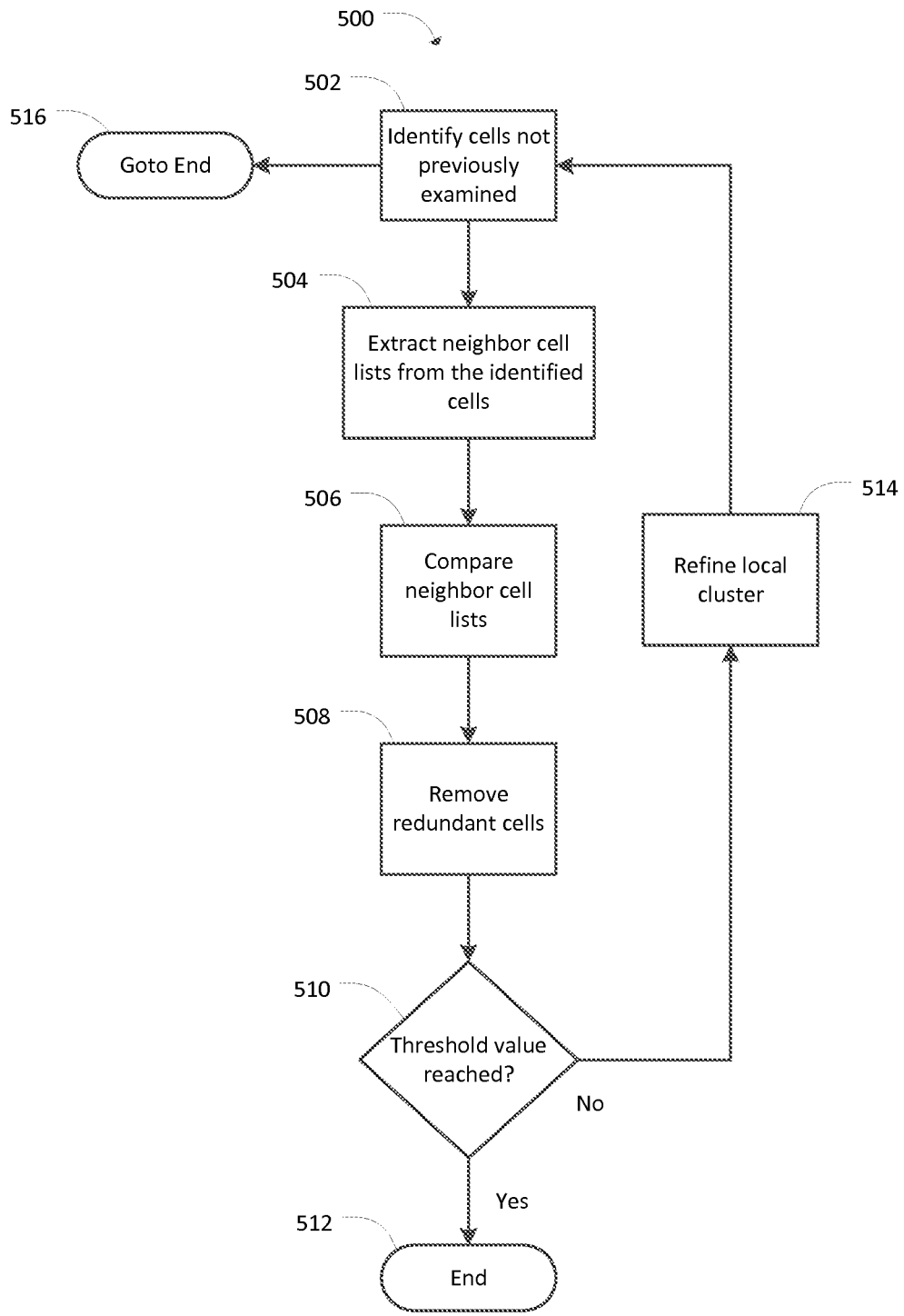
FIG. 5 illustrates a process for creating a local cluster using neighbor cell lists according to embodiments of the present invention.

FIG. 5 shows a process for generating and updating a local cluster list for a reference cell according to an embodiment. The process 500 for updating a local cluster list may begin with the neighbor cell list for the reference cell defined for UE mobility management. For example, the neighbor cell list of a reference cell may be copied to a storage area in an NRC 200. However, the scope of the present invention is not limited to starting with a neighbor cell list-in other embodiments, a local cluster list may be initiated from usage data, such as a list of cells which have had recent successful handoffs with the reference cell, or based on geometric, radio planning or geographical considerations. In yet another embodiment the process may be initiated using manually configured lists of relevant neighbor cells for a reference cell, and may take into account exclusion or inclusion lists pertaining to the reference cell. An exemplary local cluster list is illustrated in FIG. 4.

Regardless of how a local cluster list is initiated, it may be updated according to the process illustrated in FIG. 5. When a particular cell is the subject of certain maintenance and optimization operations, a large number of cells may be impacted by, or relevant to, the operations. For example, if a cell is malfunctioning and immediately neighboring cells are adjusted to make up for the lost coverage area, the adjustments to the immediately neighboring cells will have an effect on their own immediate neighbors. An imperfect analogy can be made to throwing a rock in a pond, where the initial splash creates ripples. Similarly, the effects of changes to one or more cell extend outward from the cell to encompass additional cells. An object of expansion 500 of a local cluster list is to identify cells which are affected, or potentially affected, by operations such as the replacement of a malfunctioning cell.

After an initial cluster candidate cell list has been obtained, previously unexamined cells in the candidate local cluster list are identified in step 502 (in the first pass this comprises the entire candidate cell list). In step 504 each identified candidate cell is examined to extract its neighbor cell list. The cells on the extracted cell list are then appended to the local cluster list. As multiple iterations of expansion are conducted, step 502 can substantially reduce the number of redundant operations since only previously unexamined cells are identified and processed. For example, the local cluster may include 60 cells after two iterations, and add 15 new cells in a third iteration. In this example, extracting neighbor cell lists from the 60 cells of the second operation is redundant in the third operation, so steps 502-504 can prevent resources from being wasted. In succeeding iterations step 502 may result in finding no unexamined cells remaining in which case the process exits to end in step 516.

The resulting list of cells is updated relative to the initial list, but it also might include a number of cells that are already in the local cluster list. Thus, the contents of the neighbor cell lists are compared in step 506, and redundant entries are removed in step 508. In some embodiments, the resulting list of cells is not updated relative to the initial list if the number of redundant entries is less than a threshold value, thus establishing a degree of connectedness of the neighbor cell to the cluster in order to be considered for inclusion in the cluster. In another embodiment, the redundant cells are identified and not entered into the local cluster list.

The local cluster list can be updated by repeating steps 502 to 508 for each cell in the local cluster list. A particular neighbor cell list may not include all cells that may cause interference with, or be relevant to maintenance or optimization of the reference cell. For example, a neighbor cell list may be limited to 32 cells. If the reference cell is located in a dense traffic area, such as a downtown region, more than 32 cells are relevant to certain operations with the reference cell.

In this case, updating the local cluster list using one or more iterations of the steps in process 500 captures relevant cells. Thus, the process may be iterated until a threshold value is reached in step 510. The number of iterations may be a predetermined number such as two, four, or eight. It may be understood by those skilled in the art that without steps 510 and 514 the effect of generating a cluster member list using a process 500 would otherwise grow over inclusive, i.e. include all cells that are mutual neighbors to at least one other member of the cluster starting with the reference cell.

In an embodiment, the number of iterations may be a function of the size of the neighbor cell list, where fewer iterations are performed on a larger list. The number of iterations may be determined based on cell density, where more iterations are performed in a dense cell area. Thus, the threshold value may be different for different reference cells depending on characteristics of the particular reference cell.

In another embodiment, the number of iterations may be variable, and iterations may be performed until the number of cells in the local cluster list exceeds a predetermined number, such as 60. In such an embodiment, the threshold value of step 510 is the number of cells in the local cluster list, and the process of updating the cluster through neighbor cell lists terminates when the size of the cluster reaches or exceeds the threshold value. As discussed above, this value may be different for different reference cells depending on conditions such as cell density. When the threshold value is reached, the process ends in step 512.

In an embodiment, in step 514, refinement techniques may be performed in between iterations of updating the local cluster list. Performing refinement between iterations can have the advantage of reducing the amount of processing resources by quickly converging on the relevant cluster list. In such an embodiment, refinement may be performed according to usage data, estimated RF characteristics, and geographical considerations, as explained in more detail below.

All of the cells in the neighbor cell list may not be relevant to maintenance and optimization operations for a reference cell. This issue may be exacerbated by updating a neighbor cell list according to process 500 that results in increasing the number of cells, which may include cells that are even more tenuously related to the reference cell. Thus, various techniques for refining the scope of the local cluster may be applied.

Figure 6:
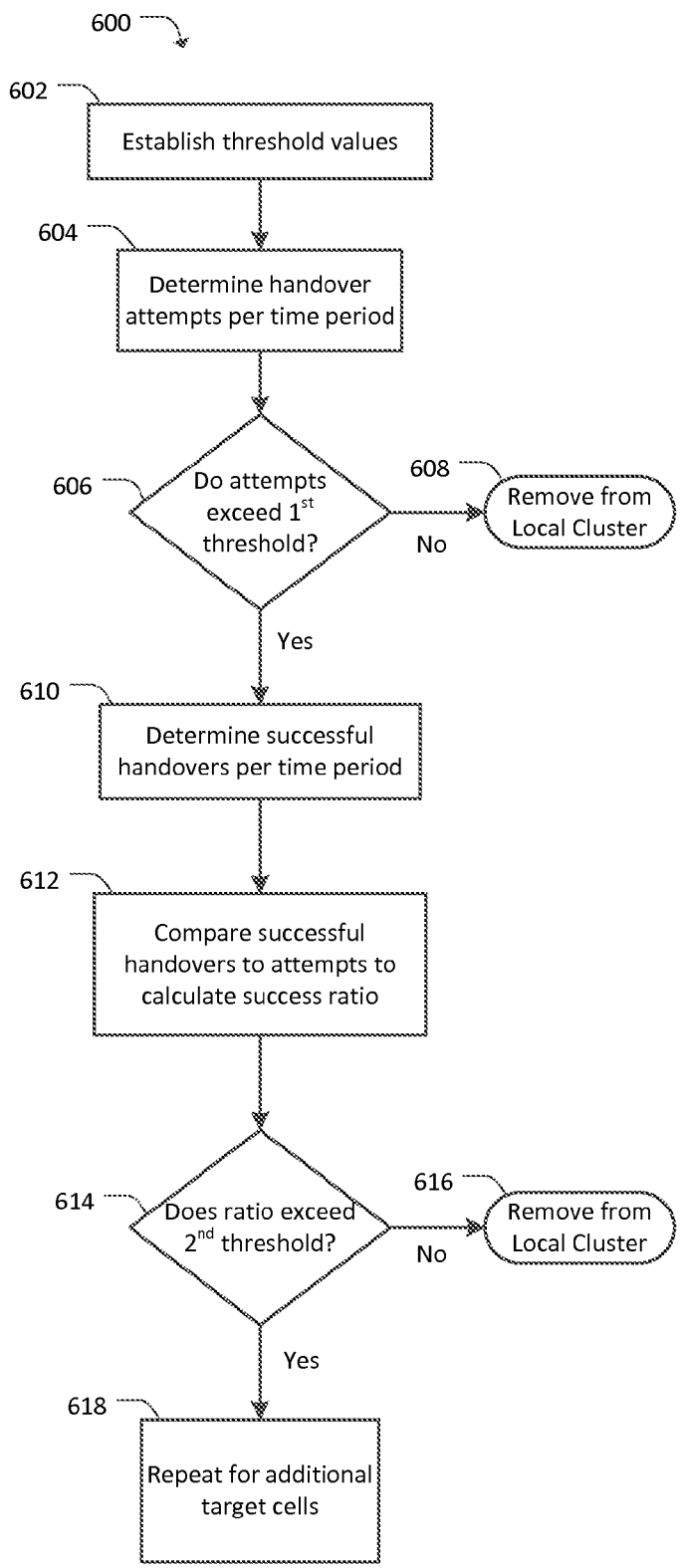
FIG. 6 illustrates a process for refining a local cluster by usage data according to embodiments of the present invention.

FIG. 6 illustrates a process 600 for refining a local cluster list using usage data according to an embodiment. The process 600 is performed using information with respect to handovers between the reference cell and a target cell. Refinement according to process 600 can help ensure that the local cluster includes the cells that are closely related to the reference cell, while cells that are not relevant to optimization and maintenance functions for the reference cell do not appear in the local cluster. In other words, refinement techniques can prevent the local cluster from being excessively over inclusive.

The handover information used in process 600, including handover attempts, successes, and failures, is for handovers between the reference cell to a target cell, i.e. a candidate cell being considered for membership in the cluster. Handover information is used in process 600 regardless of the handover direction. However, in certain embodiments, handover information about handovers to the reference cell may be considered separately from information about handovers from the reference cell.

At step 602, information about the handover attempts to or from the reference cell is examined for a particular time period. This information for each handover attempt may include the identity of cells to or from which a handover attempt is made, the cellular technology that was used, the time that the attempt was made, and whether or not the attempt was successful. As discussed above, the time period may be adjustable by a user. In addition, the time period may be a regular interval such as every four hours, or it may vary throughout the day according to different usage patterns and traffic loads. In various embodiments, the time period may be as short as a few minutes, and as long as several months.

At step 604, threshold values may be established. In some embodiments, the threshold values are predetermined, and this step is not performed. However, in other embodiments, the amount of usage data may vary significantly depending on the time of day, the geographical location, the time of year, number of users of the network, and other factors. In such cases, a step 604 of establishing threshold values may improve the quality of the local cluster.

In another embodiment, threshold values may be percentages. The percentages may be fixed, and in such an embodiment step 604 may not be performed. In another embodiment, the threshold values can be adjusted by a user locally or remotely at any point in time, such as when a local cluster list is created. The threshold values may be different depending on how a local cluster is used, in order to create a larger or smaller local cluster.

The number of handover attempts determined in step 602 is compared to a first threshold value in step 606. The first threshold value can be a natural number or a percentage, such as a percentage of all handover attempts between the reference cell and all other cells within the set time period. Then, if the number of attempts does not exceed the first threshold, in step 608, the target cell is removed from the local cluster list.

In an example, a time period is one week, the first threshold value is 50, and all handovers are considered regardless of whether the reference cell is the source or the target of the handover. If a cell that is included in the local cluster only has 45 total handover attempts within that week, it is removed from the local cluster list. However, if the cell has 52 handover attempts in the week, it is not removed from the local cluster list.

At step 610, process 600 determines the number of successful handovers to or from the reference cell. Information that is processed in this step may include the identity of the target cell, and the time and direction of successful handovers. In step 612, the number of successful handovers between a target cell and the reference cell is compared to the number of attempts determined in step 602, and a ratio between the number of attempts and the number of successes is calculated. The resulting ratio is referred to as the handover success ratio.

The handover success ratio is compared to a second threshold value in step 614, and if the success ratio is less than the threshold value, the target cell is removed from the local cluster list. If the success ratio exceeds the second threshold value, no change is made to the local cluster, and according to 618, process 600 is repeated for the remaining cells in the local cluster list.

In various embodiments, the order and number of steps of process 600 that are performed may differ. In particular, when process 600 is repeated according to step 618, not all steps may be performed. For example, step 604 of establishing threshold values may only be performed one time, and the threshold values may be used for subsequent target cells. Because the number of successful handovers is a subset of the number of attempted handovers, embodiments that perform steps 610-616 may not perform steps 604-608.

In an embodiment, only one of the threshold comparisons 606 and 614 is performed. In such an embodiment, a user may be able to decide which of the comparisons to perform. For example, when mitigating a coverage hole, total coverage area may be a significant concern, so the number of handover attempts per step 606 may provide relevant data. In contrast, successful handovers may be more relevant to optimization operations than failed handovers, so in another embodiment, step 614 may be performed instead.

The total number of handover attempts is the sum of the number of successful handovers and the number of failed handovers. Thus, although FIG. 6 shows steps performed using successful handovers and a ratio between successful handovers and total handovers, other embodiments may perform similar functions using the failed handover metric rather than the successful handover metric.

In an embodiment, usage data may be used to create a local cluster. In such an embodiment, target cells are added to the local cluster list when a threshold value of handover attempts and/or successful attempts is exceeded. For example, if the result of the comparisons in steps 606 and/or 614 is that the threshold values are exceeded, the target cell is added to the list, and the next target cell is analyzed. Such embodiments may employ only one of the comparisons of handover attempts and successful handovers.

In certain embodiments, geographical information and antenna geometry can be used to create and refine local cluster lists. Examples of using geographical information to generate and refine local cluster lists will now be explained with reference to FIGS. 7-9.

A cell in a cellular network can be defined by geographical characteristics. In general, cell geometry in a cellular network is a function of the parameters of an antenna (or group of antennae) on a base station.

Figure 7A:
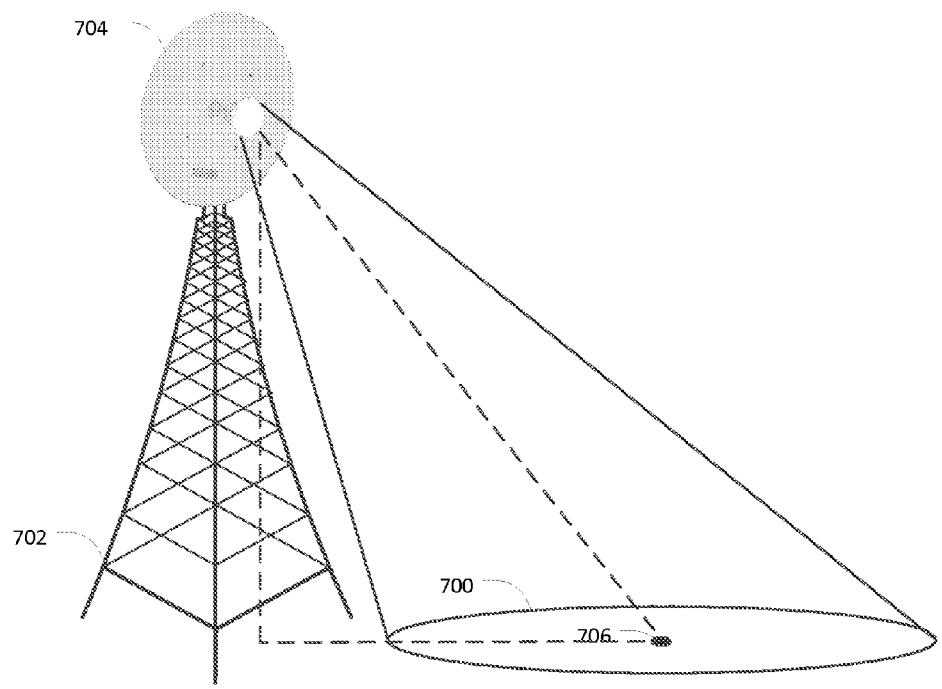
FIG. 7A is a perspective view of cell geometry.

As shown in FIG. 7A, a base station 702 includes at least one antenna 704 transmitting and receiving RF energy to a cell 700. The cell 700 has a centroid 706, which in the embodiment of FIG. 7A is the geometric center of the cell 700. Although FIG. 7A shows the cell 700 as being well defined by an exterior line, actual cells are less clearly defined, so embodiments of the present invention may use a number of parameters to determine the location of a centroid 706.

Figure 7B:
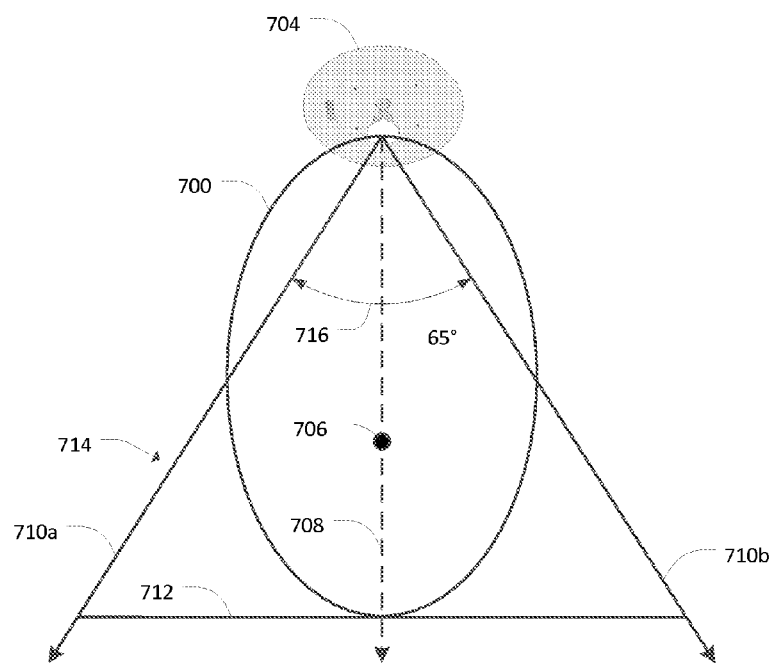
FIG. 7B is an overhead view of cell geography according to embodiments of the present invention.

The transmission power of a cell 700 is generally greatest along the boresight 708, which is shown in the overhead view of FIG. 7B. The boresight 708 may also be a line of symmetry that runs through the center of a cell 700. Azimuth beamwidth lines 710a and 710b represent boundaries of the azimuth beamwidth area. In an embodiment, the signal strength at lines 710a and 710b is diminished by 3 dB relative to the signal strength at the boresight 708. Although the azimuth beamwidth angle 716 is 65° in FIG. 7, in other embodiments the angle may be different.

The geometric area of a cell 700 may be further limited by an elevation beamwidth line 712, the location of which may be defined by a decibel loss. For example, as shown in FIG. 7B, elevation beamwidth line 712 represents a 3 dB loss relative to the maximum signal strength. However, in the embodiment shown in FIG. 7B, a similar line is not located on the side of the cell nearest the antenna.

The triangle that is made by the azimuth beamwidth lines 710a and 710b and the elevation beamwidth line 712, which is referred to herein as a beamwidth triangle 714, may be used to calculate the position of centroid 706. For example, the centroid 706 may be located at the intersection of lines from each corner of the triangle and perpendicular to the opposing side. In another embodiment, the centroid 706 is located at the midpoint of the boresight 708 in the beamwidth triangle 714. In such an embodiment, the midpoint is calculated based on the locations of boresight 706 and elevation beamwidth line 712, so it is not necessary to consider the azimuth beamwidth lines 710a and 710b in such an embodiment.

In another embodiment, the centroid 706 can be calculated through trigonometric functions based on characteristics of antenna 704. For example, a triangle can be calculated using the elevation, downtilt, direction, and the latitude and longitude of the antenna 704. Such a triangle is shown by the dotted lines of FIG. 7B. Other characteristics that may be considered in establishing the location of centroid 706 include antenna power and pattern and grade and slope of the terrain. In another embodiment, the centroid is the point of cell 700 with the highest level of antenna gain. However, in a preferred embodiment, the difference in elevation above sea level between the ground below antenna 704 and the ground on which the centroid 706 is located, is not considered.

Although several specific characteristics and processes are discussed above, persons of skill in the art will recognize that embodiments are not limited thereby, and that other geographic data and geometric techniques for establishing the location of centroid 704 are within the scope of the present invention. Other techniques could employ the use of survey and satellite equipment, as well as the use of lasers to measure distance and identify locations. The location of centroid 706 can be determined when the antenna 704 is installed, when the antenna direction is changed, at predetermined intervals, or on an as-needed basis.

Figure 8:
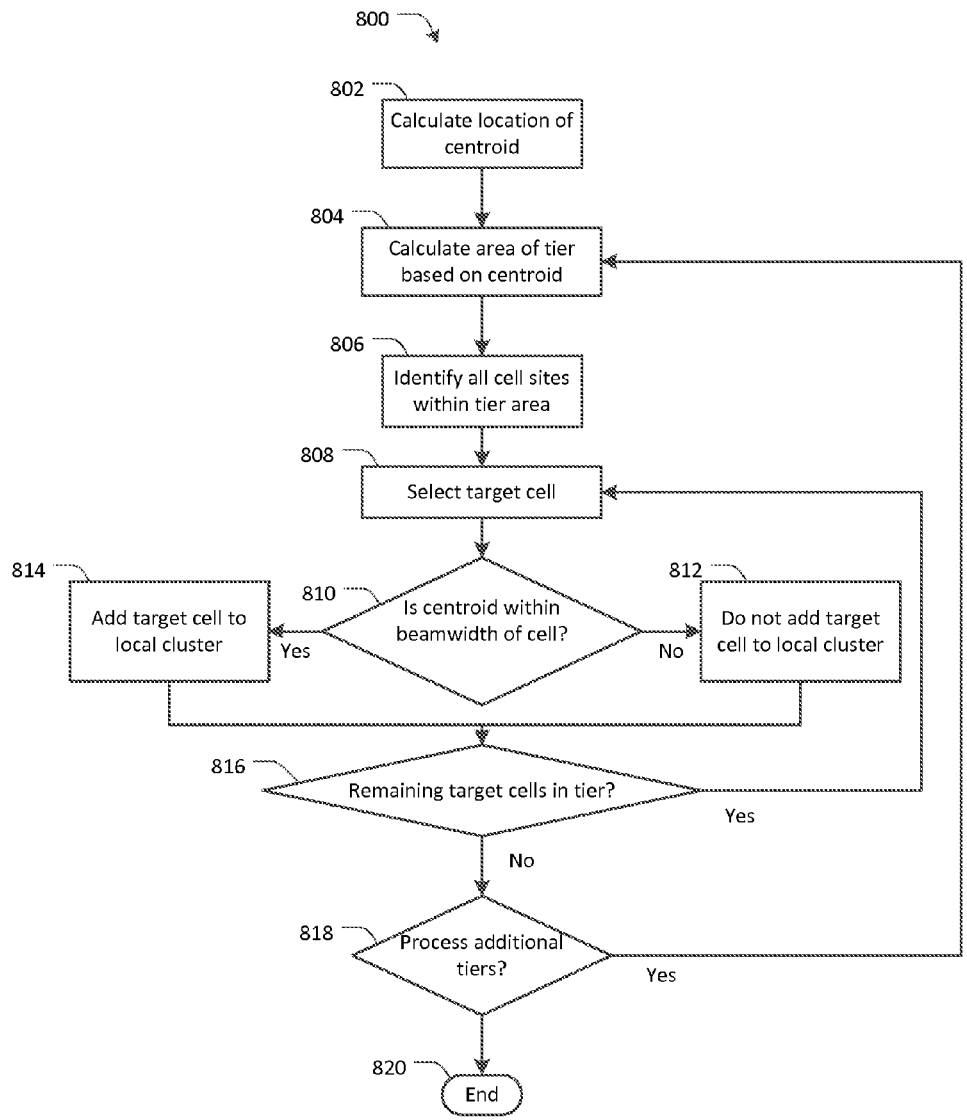
FIG. 8 illustrates a process for creating and refining a local cluster based on geography according to embodiments of the present invention.

FIG. 8 illustrates a process 800 for creating a local cluster list using one or more geometric areas, or "tiers," around a centroid for a reference cell according to an embodiment. The process 800 is explained with respect to FIG. 9, which shows two geometric tiers and a plurality of cells according to various implementations of the embodiment.

At step 802, the location of a centroid is calculated, as discussed above with respect to FIG. 7. The location of centroid 706 may be expressed in geographical coordinates such as latitude and longitude.

After the location of the centroid has been established, the area of a first tier 908 is calculated in step 804. Referring to the embodiment shown in FIG. 9, the first tier 908 is a circle with radius R1 around centroid 906, so the area of the first tier 908 is the area of the circle. Although first tier 908 is shown as a circle in FIG. 9, in other embodiments it can be another shape such as a hexagon. In embodiments, the circle can be a "flat earth" circle that does not consider deviations in elevation, or a circle that does account for deviations in elevation that are derived from a source such as a geographic information system (GIS) database.

In an embodiment, the value of R1 may be proportional to a dimension of a cell area, such as 1.5, 3, 5 or 10 times the width of a cell area. In another embodiment, the value of R1 may be a predetermined distance, such as 500 meters, 1 kilometer, or 2 kilometers. In some embodiments, the value of R1 depends on characteristics of the reference cell. For example, cells with higher power transmissions may use greater R1 values than cells with low power transmissions. In another example, the value of R1 is proportional to cell density, where values are lower in high density areas and higher in low density areas. Other characteristics which can influence the value of R1 include topography, the presence or absence of natural features, such as tree foliage and bodies of water, or manmade features such as buildings, etc.

Figure 9:
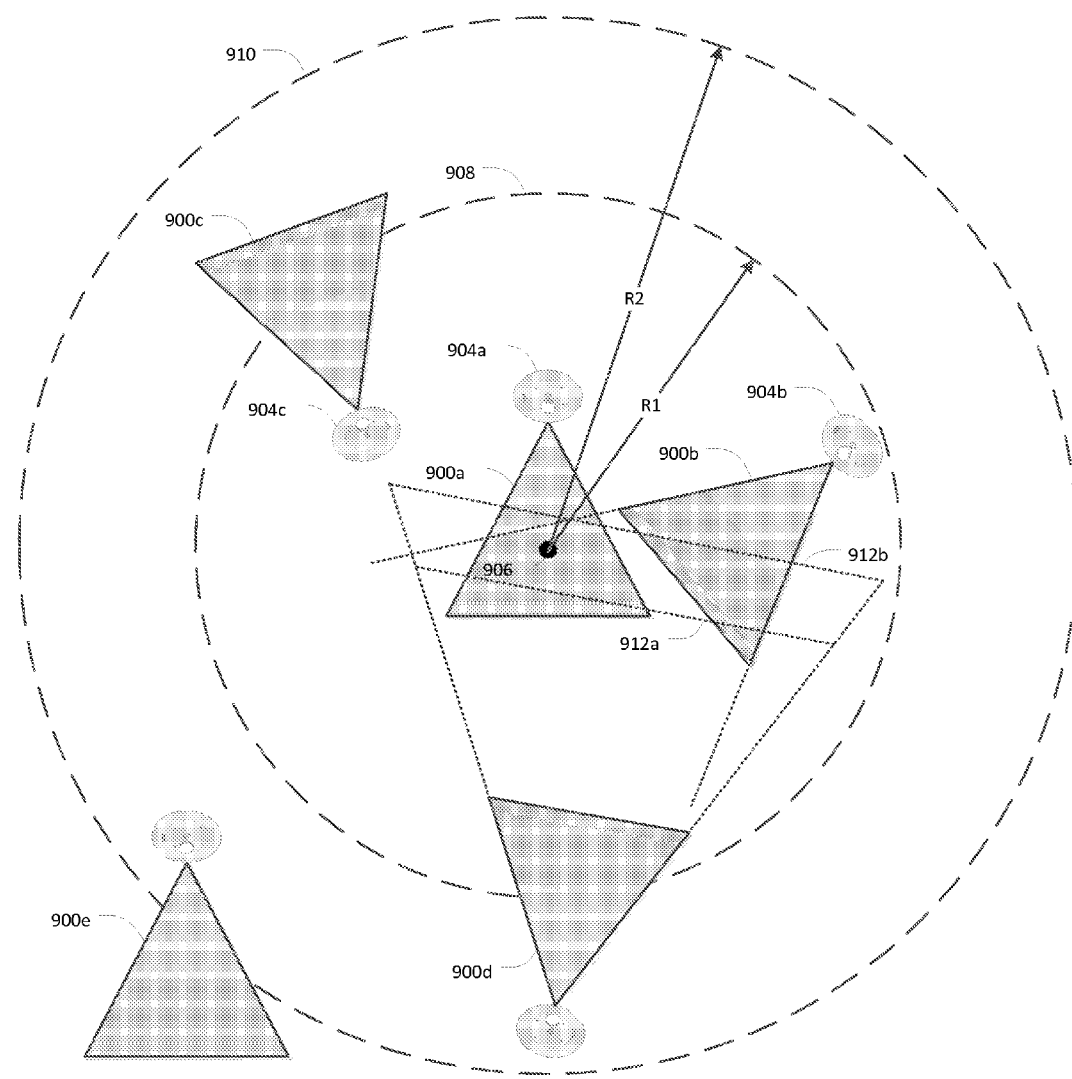
FIG. 9 illustrates geographical considerations for creating and refining a local cluster according to embodiments of the present invention.

At step 806, all cell sites within the area of first tier 908 are identified. A cell site is a physical location with one or more antenna 904 serving at least one cell 900. Typically, cell sites serve three cells for a given carrier and technology, and a plurality of carrier bands and technologies can be co-located at a single cell site. In the embodiment of FIG. 9, the cell sites within the area of first tier 908 include the cell sites with antennae 904a-c. However, the cell site with antenna 904a serves the reference cell 900a, and the reference cell is not analyzed as a target cell. Only one antenna 904 is illustrated for each cell site in FIG. 9, but in practice most cell sites have three antennae 904 to maximize the area served by the site. In FIG. 7, base station 702 is also a cell site 702.

At step 808, a target cell is selected. A cell 900 that is being processed by process 800 is referred to as the target cell and is the subject of subsequent operations. After the target cell is selected, it is determined whether or not the centroid is within the beamwidth area of the target cell is performed in step 810. Step 810 may include calculating the azimuth and elevation beamwidths of the target cell. The beamwidth of a cell 700 may be calculated based on the location and direction (i.e. boresight 706) of the cell's antenna 704, the azimuth beamwidth angle 716, and the antenna's downtilt.

The azimuth beamwidth of the cell is related to the azimuth beamwidth angle 716 shown in FIG. 7. In FIG. 7, azimuth beamwidth lines 710a and 710b define the boundaries, or area, of the azimuth beamwidth. In an embodiment, the azimuth beamwidth is the area between azimuth beamwidth lines 710a and 710b, which may be projected to at least the edges of a tier.

In an embodiment, the height dimension of the elevation beamwidth area is distance between two points along an antenna's boresight, such as the origin point (antenna location) and a point at which the signal strength is below a threshold value. The width dimension of the elevation beamwidth area may be an value that captures a very broad azimuth.

An embodiment may calculate one or both of azimuth and elevation beamwidth area values. In an embodiment in which the beamwidth area includes both azimuth beamwidth and elevation beamwidth, the area may be a triangle such as the triangle of lines 710a, 710b, and 712, as shown in FIG. 7B and described above.

The first tier 908 of FIG. 9 includes two target cells, 900b and 900c. The azimuth beamwidth lines of cell 900b are shown by the dotted lines extending from the triangular cell 900b. Centroid 906 lies in between the extended azimuth beamwidth lines of cell 900b, so it is within the azimuth beamwidth of the target cell. Therefore, if process 800 is being used to create a local cluster list, cell 900b is added to the local cluster list in step 814. If process 800 is being used to refine a pre-existing local cluster list, an entry for cell 900b is maintained in the local cluster list in step 814.

In contrast, antenna 904c points away from centroid 906, and the centroid is not within the beamwidth area of associated cell 900c. Thus, when a local cluster list is being created, it is determined to not add cell 900c to the local cluster in step 812. In another embodiment, cell 900c may be added to the local cluster list in step 806, and subsequently removed from the list if the centroid is not within the beamwidth area of the cell. If process 800 is being performed to refine a pre-existing local cluster, cell 900c is removed from the local cluster list in step 812. Thus, process 800 can be used to either create or refine a local cluster and associated local cluster list.

At step 816, the process 800 includes determining whether all cells within the first tier have been assessed with respect to steps 808-814. In other words, every cell in the first tier is analyzed to determine whether it is relevant to maintenance and optimization operations that may be performed with respect to reference cell 900a, and if they are relevant, they are added to, or maintained in, a local cluster list. In the preceding description of process 800, the combined features of being within a set distance from the centroid 906 of reference cell 900a, and having a beamwidth area that includes the centroid, serve to establish relevance of a target cell.

In other embodiments, relevance may correspond to other determinations. For example, instead of the centroid 906, an embodiment may determine whether any part of a cell area 900a is included in the beamwidth area of a target cell. Such an embodiment will have a larger local cluster than an embodiment where the centroid 906 is used. In another embodiment, processing resources can be preserved by using a site location instead of a centroid for purposes of calculating the area of a tier, and/or for determining whether the site location is within the beamwidth area of a target cell.

Although the azimuth beamwidth angle 716 in FIG. 7B is 65°, the azimuth beamwidth angle of target cells can may differ in various embodiments, or even within the same embodiment. When the azimuth beamwidth angle 716 is larger, more target cells are included in the local cluster by process 800, while a smaller azimuth beamwidth angle 716 results in the local cluster having fewer cells. The azimuth beamwidth area may extend to the end of a tier, or a predetermined distance from the antenna of the target cell.

Returning to FIG. 8, step 818 includes determining whether additional tiers are processed. In an embodiment, only one tier is processed, so steps 804-816 are only performed with respect to a single tier area. However, other embodiments can include additional tiers. Thus, if it is determined that an embodiment includes additional tiers, steps 804-806 are repeated for each additional tier.

The area of additional tiers can be calculated in the same fashion described above with respect to step 804. As shown in FIG. 9, a second tier 910 is a circle with radius R2 from centroid 906. To obtain the area of the second tier 910, the area of the first tier 908 is subtracted from the area of the second circle, and the remaining area is the area of the second tier 910. The area of subsequent tiers can be obtained by repeating this process, including subtracting the area of the previous tier from the tier that is being created. Subsequent tiers are larger than previous tiers, and include cells that were not included in previous tiers.

In the embodiment of FIG. 9, both cell 900d and cell 900e are in the second tier 910. However, while the centroid 906 is within the azimuth beamwidth of cell 900d, centroid 906 is not within the azimuth beamwidth of cell 900e. Thus, if process 900 is being used to create a local cluster list and the beamwidth area includes the azimuth beamwidth area, cell 900d is added to the list, while cell 900e is not added. If process 900 is being used to refine a local cluster list, cell 900d is maintained in the local cluster list, while cell 900e is removed from the list.

Similarly, in an embodiment, elevation beamwidth may be considered in determining whether the centroid is within the beamwidth area of cell 900d. For example, FIG. 9 shows two elevation beamwidth lines 912a and 912b for cell 900d. While centroid is within the elevation beamwidth area 912b, it is not within the elevation beamwidth area 912b. Thus, in step 810 of determining whether the centroid is within the beamwidth of a cell, embodiments may determine whether the centroid is within the cell's azimuth beamwidth area, elevation beamwidth area, or both.

In an embodiment with more than one tier, the azimuth beamwidth angle 716 may be different for each tier. The influence of cells tends to diminish as distance from the reference cell increases, so few cells that are a great distance from the reference cell are relevant to maintenance and optimization of the reference cell. Thus, in an embodiment with a plurality of tiers, the azimuth beamwidth angles of the target cells within the tiers may decrease as the tiers expand outwards. In an embodiment, the azimuth beamwidth angle may be a function of distance from the center of the tiers, where the beamwidth angle decreases with respect to distance. Such an embodiment may establish a single tier, where the azimuth beamwidth of cells decreases towards the outer edges of the tier.

Figure 10:
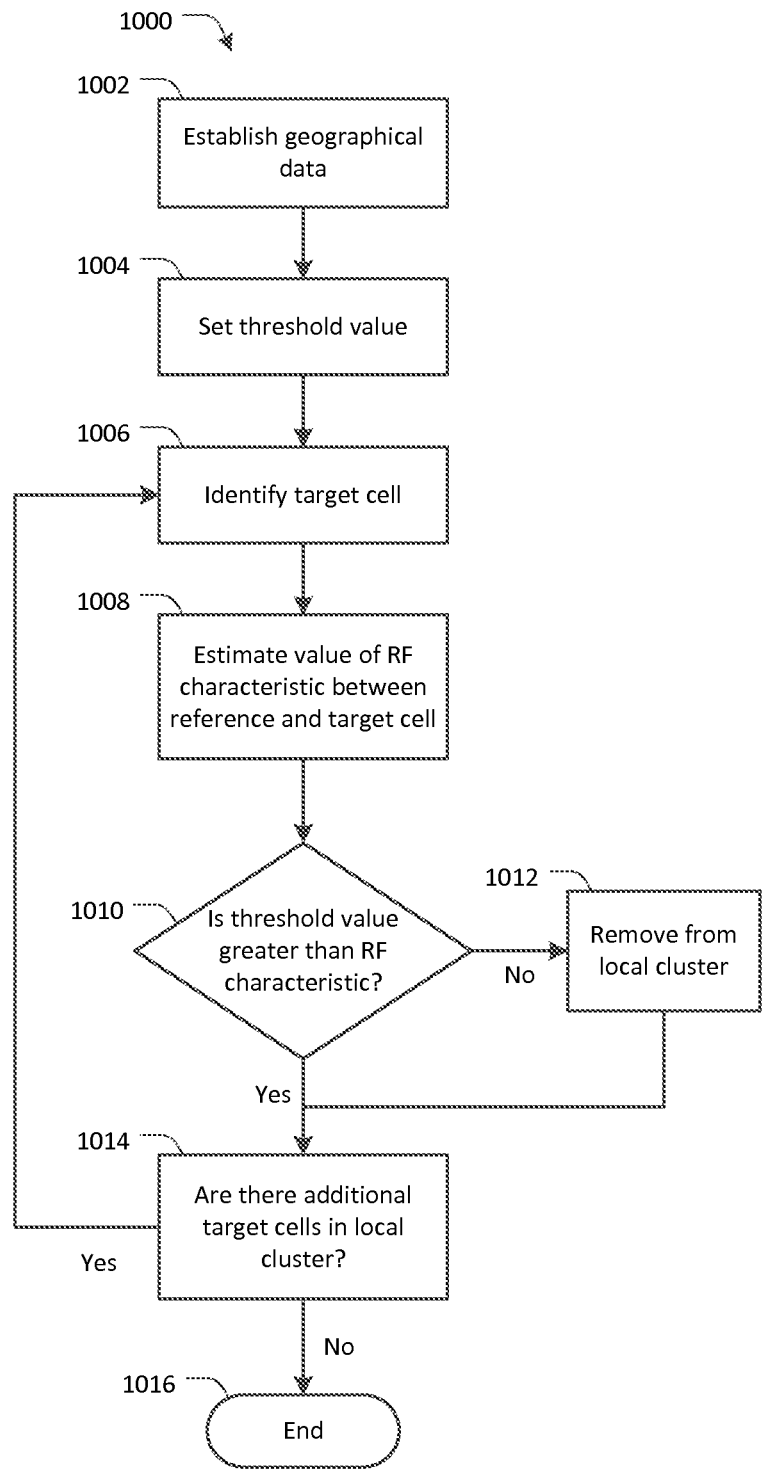
FIG. 10 illustrates a process for refining a local cluster based on RF information according to embodiments of the present invention.

FIG. 10 illustrates a process 1000 for generating and/or refining a local cluster and associated local cluster list using RF information according to an embodiment. The RF information used in process 1000 may be an estimate of RF signal strength and/or interference between the reference cell and a target cell. Examples of RF information include estimated values of RF characteristics such as Received Signal Strength Indication (RSSI), Carrier to Interference plus Noise Ratio (CINR), and Signal to Interference plus Noise Ratio (SINR). Embodiments may interface with an existing cellular network planning tool to perform one or more of the steps of process 1000. Other embodiments may interface with collected drive test data or collected UE data to perform one or more steps of process 1000.

At step 1002, geographical data are retrieved. The geographical data may be extracted or derived from a GIS database. The geographical data may include terrain features such as bodies of water, hills, and mountains that affect the quality of RF transmissions. The geographical data may also include seasonal features, such as the location of foliage, or an accumulation of snow.

A threshold value is set for one or more RF characteristics that are used in subsequent steps of process 1000 in step 1004. In an embodiment, the threshold value is predetermined, and step 1004 is not performed. In another embodiment, the threshold value may be set by a user or a processor in step 1004. In certain embodiments, the processor may set the threshold value based on an algorithm using variables such as the type of maintenance or optimization operation being performed on the reference cell, the density of cells around the reference cell, etc.

At step 1006, a target cell is identified. Subsequent operations 1008-1012 are performed with respect to the individual target cell.

The value of the RF characteristic between the target cell and the reference cell is estimated in step 1008. The value may be estimated using conventional techniques for estimating RF signal quality, such as an RF propagation loss model. In an embodiment, step 1008 is performed independently of refinement of the local cluster. In such an embodiment, step 1008 may involve extracting the existing RF signal quality information. In an embodiment, comparison of the RF characteristics between the target and reference cells is performed over the overlap areas of operational coverage of the two cells and an averaged RF characteristic is estimated for the overlap area. In some embodiments, the size of the overlap area is also factored into the average RF characteristic comparison as a weighting factor so that smaller overlap areas are ranked lower than larger overlap areas.

At step 1010, the value of the RF characteristic is compared to the predetermined value. If the threshold value is greater than the value of the RF characteristic, the target cell is removed from the local cluster list in step 1012. If the threshold value is less than the value of the RF characteristic, the target cell is maintained in the local cluster list, and the process proceeds to step 1014.

At step 1014, if there are additional target cells that have not been processed according to process 1000, the process loops back to 1006 to identify the next target cell. When all of the target cells in the local cluster have been processed, the process terminates in step 1016.

Figure 11:
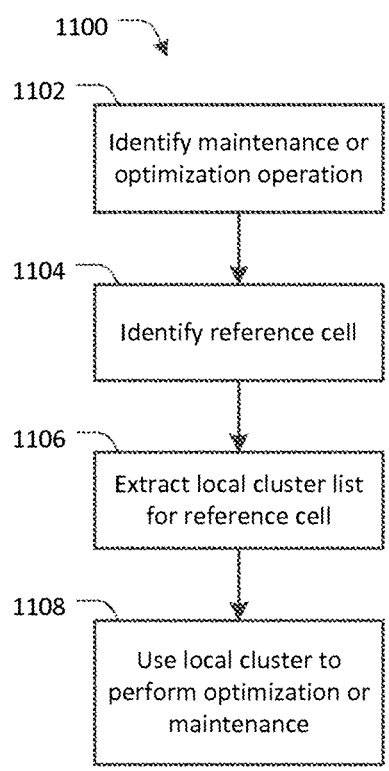
FIG. 11 illustrates a process for using a local cluster according to embodiments of the present invention.

FIG. 11 shows a process 1100 of using a local cluster list. In step 1102, a maintenance or optimization operation is identified. The maintenance operation can be any maintenance operation that affects one or more characteristic of a reference cell, such as disabling a cell to replace or perform maintenance on equipment associated with the reference cell, repairing malfunctioning equipment associated with a cell, or replacing the coverage area of a reference cell. Optimization operations include load balancing operations that are performed on one or more cells, changing parameters of cells to optimize performance with respect to a new cell, and other operations that may be performed on a periodic or as-needed basis to improve network performance.

In step 1104, the reference cell is identified. In certain situations, such as malfunctioning base station equipment, the identity of a problematic cell may not be immediately apparent, so a technician may have to perform testing to determine the identity of a malfunctioning cell. In other operations, such as optimization operations, the identity of one or more reference cell may be determined based on the type of optimization that is performed.

After the reference cell has been identified, its local cluster list is extracted in step 1106. If the local cluster list is generated automatically, extracting the local cluster list may include moving local cluster information from a first virtual or physical location to a second virtual or physical location. For example, the local cluster list may be stored in one part of a networked computer system such as the base station associated with the reference cell, and the local cluster list may be copied to an NRC for the maintenance or optimization. However, embodiments are not limited by this implementation-in other embodiments, the local cluster list is generated and stored in an NRC or other computing device that is part of the networked computer system.

In an embodiment, the local cluster list is generated in step 1106. The local cluster list may be generated by a user command, or automatically as a part of the maintenance or optimization process.

In step 1108, the local cluster is used to perform an optimization or maintenance operation. The local cluster list may be used by a technician to identify relevant cells, or used by an algorithm executed by a processor as part of an automated optimization or maintenance process. Persons of skill in the art will recognize that a local cluster according to the present invention may have extensive utility in cell maintenance and optimization operations. The following two non-limiting examples are given to help illustrate some of the ways that a local cluster can be used.

In the first example, a data center receives information that a cell is experiencing anomalous behavior, but the cause is not clear. A technician is dispatched to investigate the problem, and cannot detect any faults in the anomalous cell, which is the current reference cell, so the technician determines that the anomalous behavior is likely the result of a malfunction in a different cell. In this case, the technician extracts the local cluster list for the reference cell, and investigates the behavior of the cells in the local cluster list to find the source of the problem. Because the anomalous behavior is recent, the technician selects a local cluster list that is refined based on usage data over the last two hours, which is the time window in which the anomalous behavior occurred.

After finding the source, the technician extracts the local cluster list from the source cell, which is the reference cell for the associated local cluster. The technician takes the new reference cell offline, and adjusts parameters for cells in the local cluster as defined by the local cluster list to make up for the coverage area of the missing cell while repairs are being made.

In the second example, the processor in an NRC performs an automated optimization process when a new cell is installed. No usage data or neighbor cell list is available for the new cell, so a local cluster is created using the centroid of the planned cell area, and refined with RF estimates. An NRC generates the local cluster for the new cell, which is the reference cell for the cluster. In this case, the local cluster includes power, elevation, and azimuth information for each cell in the local cluster. This information is used to determine optimized parameters for the new cell, and to determine adjustments to be made to the cells in the local cluster to accommodate the new cell.

In various embodiments, a local cluster may be created using one process, and refined using a second process. For example, a local cluster may be created using neighbor cell lists according to process 500, and then refined by usage data in a process 600. In another embodiment, a local cluster is created with geographic information according to process 800, refined using RF estimates according to process 1000, and further refined with usage data according to process 600. Thus, it should be appreciated that processes for creating and refining local clusters disclosed herein can be combined in various embodiments.

In addition, embodiments may include a plurality of local clusters for a particular reference cell. For example, a reference cell can have a local cluster for intra-cell operations and a local cluster for inter-cell operations.

A local cluster may be created for a single Radio Access Technology (RAT), or a plurality of RATs. In specific embodiments, the reference cell uses a first type of RAT, and cells in the local cluster use a second RAT that use a frequency spectrum that can interfere with transmissions of the reference cell. For example, the second RAT may have a frequency spectrum that overlaps with, or is adjacent to, the frequency spectrum of the first RAT.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A networked computer system in a cellular communications network comprising:
   a processor;
   a memory; and
   a non-transitory computer readable medium with computer executable instructions stored thereon which, when executed by the processor, perform the following method:
   generating a local cluster list by identifying a plurality of cells that are relevant to a maintenance or optimization operation of a reference cell using any one of a neighbor cell list, a centroid of the reference cell, radio network planning data, usage data of the reference cell, or a combination thereof, the local cluster list including local cluster information for the plurality of cells that are relevant to the maintenance or optimization operation; and
   storing the local cluster list in the memory,
   wherein generating the local cluster list using the centroid of the reference cell comprises:
   calculating a location of the centroid of the reference cell;
   establishing an area of a first tier by calculating the area of a first shape centered at the centroid;
   determining a plurality of cells within the first tier; and
   adding the plurality of cells within the first tier to the local cluster list.

2. The networked computer system of claim 1, wherein generating the local cluster list using at least one neighbor cell list further comprises:
   extracting a first neighbor cell list from the reference cell;
   identifying a plurality of target cells in the neighbor cell list from the reference cell;
   extracting neighbor cell lists from each of the plurality of target cells; and
   including cells in the neighbor cell lists from each of the plurality of target cells in the local cluster list.

3. The networked computer system of claim 1, wherein adding the plurality of cells within the first tier to the local cluster list further comprises, for each cell of the plurality of cells within the first tier:
   calculating a beamwidth area;

determining whether the centroid is within the beamwidth area;

if the centroid is within the beamwidth area, adding the cell associated with the beamwidth area to the local cluster list; and if the centroid is not within the beamwidth area, not adding the cell associated with the beamwidth area to the local cluster list.

4. The networked computer system of claim 3, wherein generating the local cluster list using the centroid of the reference cell further comprises:

establishing the area of a second tier by calculating the area of a second shape with a second area greater than a first area of the first shape and subtracting the area of the first shape from the second shape;

determining a plurality of cells within the area of the second tier;

adding the plurality of cells within the area of the second tier to the local cluster list;

calculating, for each cell within the area of the second tier and outside the area of the first tier, a second tier beamwidth area;

determining whether the centroid is within the second tier beamwidth area of each cell within the area of the second tier and outside the area of the first tier;

if the centroid is within the second tier beamwidth area, adding the cell associated with the second tier beamwidth area to the local cluster list; and if the centroid is not within the second tier beamwidth area, not adding the cell associated with the second tier beamwidth area to the local cluster list.

5. The networked computer system of claim 1, wherein generating the local cluster list using usage data of the reference cell comprises:

determining at least one cell with which a handover operation between the at least one cell and the reference cell was attempted within a time period; and adding the at least one cell to the local cluster list.

6. The networked computer system of claim 1, wherein the non-transitory computer readable medium with computer executable instructions stored thereon further includes instructions which, when executed by the processor, cause the processor to refine the local cluster list.

7. The networked computer system of claim 6, wherein refining the local cluster list further comprises, for each cell of the plurality of cells within the first tier:

calculating a beamwidth area;

determining whether the centroid is within the beamwidth area; and if the centroid is not within the beamwidth area, removing the cell associated with the beamwidth area from the local cluster list.

8. The networked computer system of claim 6, wherein refining the local cluster list comprises:

extracting geographic information from a geographic information system;

establishing a threshold value;

estimating a radio frequency (RF) transmission characteristic value between the reference cell and a cell within the local cluster list; and if the threshold value exceeds the estimated RF transmission characteristic value, removing the cell within the local cluster list from the local cluster list.

9. The networked computer system of claim 6, wherein refining the local cluster list comprises:

determining whether a handover operation has been attempted between a cell within the local cluster list and the reference cell within a time period; and if no handover operation has been attempted between the cell within the local cluster list and the reference cell within the time period, removing the cell within the local cluster list from the local cluster list.

10. The networked computer system of claim 1, wherein the local cluster list is used to perform a maintenance operation for maintaining the cellular communications network or an optimization operation for optimizing the cellular communications network.

11. A method, comprising:

generating a local cluster list by identifying a plurality of cells that are relevant to a maintenance or optimization operation of a reference cell in a cellular network using any one of a neighbor cell list, a centroid of the reference cell, radio network planning data, usage data of the reference cell, or a combination thereof, the local cluster list including local cluster information for the plurality of cells that are relevant to the maintenance or optimization operation; and storing the local cluster list in the memory, wherein generating the local cluster list using the centroid of the reference cell comprises:

calculating a location of the centroid of the reference cell;

establishing an area of a first tier by calculating the area of a shape centered at the centroid;

determining a plurality of cells within the first tier; and adding the plurality of cells within the first tier to the local cluster list.

12. The method of claim 11, wherein adding the plurality of cells within the first tier to the local cluster list further comprises, for each cell of the plurality of cells within the first tier:

calculating a beamwidth area;

determining whether the centroid is within the beamwidth area;

if the centroid is within the beamwidth area, adding the cell associated with the beamwidth area to the local cluster list; and if the centroid is not within the beamwidth area, not adding the cell associated with the beamwidth area to the local cluster list.

13. The method of claim 11, further comprising refining the local cluster list by:

calculating a beamwidth area;

determining whether the centroid is within the beamwidth area; and if the centroid is not within the beamwidth area, removing the cell associated with the beamwidth area from the local cluster list.

14. The method of claim 11, further comprising refining the local cluster list by:

determining whether a handover operation has been attempted between a cell within the local cluster list and the reference cell within a time period; and if no handover operation has been attempted between the cell within the local cluster list and the reference cell within the time period, removing the cell within the local cluster list from the local cluster list.

15. A non-transitory computer readable medium with computer executable instructions stored thereon which, when executed by the processor, perform the following method:

generating a local cluster list by identifying a plurality of cells that are relevant to a maintenance or optimization operation of a reference cell using any one of a neighbor cell list, a centroid of the reference cell, radio network planning data, usage data of the reference cell, or a combination thereof, the local cluster list including local cluster information for the plurality of cells that are relevant to the maintenance or optimization operation; and storing the local cluster list in the memory, wherein generating the local cluster list using the centroid of the reference cell comprises:

calculating a location of a centroid of the reference cell;

establishing an area of a first tier by calculating the area of a first shape centered at the centroid;

determining a plurality of cells within the first tier; and adding the plurality of cells within the first tier to the local cluster list.

16. The non-transitory computer readable medium of claim 15, further comprising:

adding the plurality of cells within the first tier to the local cluster list by:

calculating a beamwidth area;

determining whether the centroid is within the beamwidth area;

if the centroid is within the beamwidth area, adding the cell associated with the beamwidth area to the local cluster list; and if the centroid is not within the beamwidth area, not adding the cell associated with the beamwidth area to the local cluster list.

17. The non-transitory computer readable medium of claim 15, wherein the method further comprises refining the local cluster list by:

calculating a beamwidth area;

determining whether the centroid is within the beamwidth area; and if the centroid is not within the beamwidth area, removing the cell associated with the beamwidth area from the local cluster list.

18. The non-transitory computer readable medium of claim 15, wherein the method further comprises refining the local cluster list by:

determining whether a handover operation has been attempted between a cell within the local cluster list and the reference cell within a time period; and if no handover operation has been attempted between the cell within the local cluster list and the reference cell within the time period, removing the cell within the local cluster list from the local cluster list.

19. A networked computer system in a cellular communications network comprising:

a processor;

a memory; and a non-transitory computer readable medium with computer executable instructions stored thereon which, when executed by the processor, perform the following method:

generating a local cluster list by identifying a plurality of cells that are relevant to a maintenance or optimization operation of a reference cell using any one of a neighbor cell list, a centroid of the reference cell, radio network planning data, usage data of the reference cell, or a combination thereof, the local cluster list including local cluster information for the plurality of cells that are relevant to the maintenance or optimization operation;

refining the local cluster list; and storing the local cluster list in the memory, wherein refining the local cluster list comprises:

calculating a location of a centroid of the reference cell;

establishing an area of a first tier by calculating the area of a first shape centered at the centroid;

determining whether each cell in the list of the plurality of cells is located within the area of the first tier; and if each cell is not located within the area of the first tier, removing each cell from the local cluster list.

20. A networked computer system in a cellular communications network comprising:

a processor;

a memory; and a non-transitory computer readable medium with computer executable instructions stored thereon which, when executed by the processor, perform the following method:

generating a local cluster list by identifying a plurality of cells that are relevant to a maintenance or optimization operation of a reference cell using anyone of a neighbor cell list, a centroid of the reference cell, radio network planning data, usage data of the reference cell, or a combination thereof, the local cluster list including local cluster information for the plurality of cells that are relevant to the maintenance or optimization operation;

refining the local cluster list; and storing the local cluster list in the memory, wherein refining the local cluster list comprises:

extracting geographic information from a geographic information system;

estimating a radio frequency (RF) transmission characteristic value between the reference cell and a cell within the local cluster list using the extracted geographic information;

comparing the estimated RF transmission characteristic value to a threshold value; and if the threshold value exceeds the estimated RF transmission characteristic value, removing the cell within the local cluster list from the local cluster list.

* * * * *